United States Patent [19]

Feild, Jr.

[11] Patent Number: 4,699,759
[45] Date of Patent: Oct. 13, 1987

[54] DOUBLE LOCK JOINT FOR ATTACHING TOP NOZZLE TO GUIDE THIMBLES OF NUCLEAR FUEL ASSEMBLY

[75] Inventor: Alexander L. Feild, Jr., Mt. Lebanon Township, Allegheny County, Pa.

[73] Assignee: Westinghouse Electric Corp., Pittsburgh, Pa.

[21] Appl. No.: 744,082

[22] Filed: Jun. 12, 1985

[51] Int. Cl.$^4$ .............................................. G21C 3/32
[52] U.S. Cl. ..................................... 376/446; 376/441; 376/442; 376/449
[58] Field of Search ................ 376/446, 441, 442, 449

[56] References Cited

U.S. PATENT DOCUMENTS

| 4,208,248 | 6/1980 | Jabsen | 376/446 |
| 4,326,921 | 4/1982 | Cadwell | 376/449 |
| 4,535,523 | 8/1985 | Leclercq | 376/446 |

FOREIGN PATENT DOCUMENTS 2129189  5/1984  United Kingdom ................ 376/446

Primary Examiner—Donald P. Walsh

[57] ABSTRACT

A double lock joint structure is used in a reconstitutable fuel assembly for attaching the adapter plate of the assembly top nozzle in releasable locking engagement upon the upper end portions of the assembly guide thimbles. The joint structure includes axially extending slots defined in each guide thimble upper end portion permitting inward elastic collapse thereof to a compressed position and outward elastic return thereof to an expanded position. The joint structure also includes axially spaced upper and lower annular bulges formed in the upper end portion. The upper annular bulge has an outside diametric size greater than the inside diametric size of the adapter plate passageway when the guide thimble upper end portion is at its expanded position and less than the inside diametric size of the adapter plate passageway when the upper end portion is collapsed to its compressed position allowing insertion and withdrawal of the upper end portion into and from the adapter plate passageway. The lower annular bulge has an outside diametric size greater than the inside diametric size of the adapter plate passageway when the guide thimble upper end portion is at either one of its expanded and collapsed positions. The upper annular bulge is axially displaced from the lower annular bulge through a distance approximately equal to that between the top and bottom surfaces of the adapter plate such that after insertion of the upper end portion of the guide thimble through the adapter plate passageway the adapter plate is placed in a captured position between the upper and lower annular bulges. Furthermore, the joint structure includes a locking tube insertable into and removable from each guide thimble upper end portion between a locking position which maintains the upper end portion in the expanded position and the adapter plate in the captured position between the upper and lower annular bulges and an unlocking position which permits the upper end portion to inwardly collapse to the compressed position upon insertion and removal of the adapter plate onto and from the upper end portion of the guide thimble. The locking tube includes upper and lower axially displaced protuberances adapted to mate with the upper and lower bulges of the guide thimble upper end portion when the locking tube is inserted at its locking position therein, and a top annular flange located above the upper protuberance for facilitating insertion and removal of the tube into and from the guide thimble upper end portion.

12 Claims, 5 Drawing Figures

DOUBLE LOCK JOINT FOR ATTACHING TOP NOZZLE TO GUIDE THIMBLES OF NUCLEAR FUEL ASSEMBLY

CROSS REFERENCE TO RELATED APPLICATIONS

Reference is hereby made to the following copending applications dealing with related subject matter and assigned to the assignee of the present invention:

1. "Reconstituting A Nuclear Reactor Fuel Assembly" by Robert K. Gjersten et al, assigned U.S. Ser. No. 564,056 and filed Dec. 31, 1983 (W.E. 49,189).

2. "Nuclear Reactor Fuel Assembly With A Removable Top Nozzle" by John M. Shallenberger et al, assigned U.S. Ser. No. 644,758 and filed Aug. 27, 1984 (W.E. 51,311I) which is a continuation-in-part of U.S. Ser. No. 537,775, filed Sept. 30, 1983, now abandoned.

3. "Reusable Locking Tube In A Reconstitutable Fuel Assembly" by John M. Shallenberger et al, assigned U.S. Ser. No. 719,108 and filed Apr. 2, 1985 (W.E. 52,507).

4. "Guide Thimble Captured Locking Tube In A Reconstitutable Fuel Assembly" by Gary E. Paul, assigned U.S. Ser. No. 717,991 and filed Mar. 29, 1985 (W.E. 52,508).

BACKGROUND OF THE INVENTION

1. Field of the Invention

The present invention relates generally to fuel assemblies for nuclear reactors and, more particularly, is concerned with a double lock joint for attaching the top nozzle of a fuel assembly to its guide thimbles in a manner which allows easy removal and replacement of the top nozzle.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array by grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of the integral assembly of guide thimbles welded to the top and bottom nozzle, it is difficult to detect and remove the failed rods.

Until recently, to gain access to these rods it was necessary to remove the affected assembly from the nuclear reactor core and then break the welds which secure the nozzles to the guide thimbles. In so doing, the destructive action often renders the fuel assembly unfit for further use in the reactor because of the damage done to both guide thimbles and the nozzle which prohibits rewelding.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One early method of reconstituting the fuel assembly by removing and replacing its top nozzle is illustrated and described in the first patent application cross-referenced above. The top nozzle is removed by severing the guide thimbles just below where they are welded to the adapter plate of the top nozzle. Then, before the top nozzle is replaced just below where they are welded to the adapter plate of the top nozzle. Then, before the top nozzle is replaced back on the guide thimbles, annular grooves are formed in the passageways of the adapter plate. After the top nozzle is placed back on the guide thimbles with the latter inserted into the adapter plate passageways, circumferential portions of the upper ends of the guide thimbles are bulged into the passageway grooves so as to secure the top nozzles to the guide thimbles.

An alternative approach to the above reconstitution method is illustrated and described in the second patent application cross-referenced above. An attaching structure for removably mounting the top nozzle on the upper ends of the guide thimbles is disclosed. The attaching structure includes a plurality of outer sockets defined in the adapter plate of the top nozzle, a plurality of inner sockets with each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove formed therein. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets, and thereby the attachment of the top nozzle on the upper ends of the guide thimbles.

Furthermore, to prevent inadvertent escape due to vibration forces and the like, heretofore the locking tubes have been secured in their locking positions. After insertion of the locking tubes into their locking positions within the inner sockets of the hollow upper end portions of the guide thimbles, a pair of bulges are formed in the upper portion of each locking tube. These bulges fit into the circumferential bulge in the upper end portion of the guide thimble and provide an interference fit therewith.

Notwithstanding the overall acceptability of the above-described approaches, one disadvantage is that each requires the machining of annular grooves in the passageways of the top nozzle adapter plate. Consequently, a need remains for still another alternative approach to fuel assembly reconstitution which may further enhance commercial acceptance thereof.

SUMMARY OF THE INVENTION

The present invention provides a reconstitutable fuel assembly with improved features for locking the top nozzle upon and unlocking it from the guide thimbles which are designed to satisfy the aforementioned need. The present invention introduces a double lock joint concept which provides a tighter and stronger connection between the top nozzle and guide thimbles than heretofore. In particular, positive locking is provided at two elevations by axially spaced bulges on the guide thimbles which capture the top nozzle adapter plate therebetween. Excellent axial strength and resistance to transverse loading are built into the double lock joint. Furthermore, the design provides easy insertion and removal of the guide thimbles and locking tubes, eliminates the need for machining of internal annular grooves in the adapter plate passageways, and exhibits superior joint alignment and protection against joint slippage.

Accordingly, the present invention sets forth in a reconstitutable fuel assembly including at least one guide thimble with an upper end portion having a central axis and a top nozzle with an adapter plate having top and bottom spaced apart surfaces and at least one passageway extending between the surfaces, a double lock joint structure for attaching the top nozzle adapter plate in releasable locking engagement upon the guide thimble upper end portion. The double lock joint structure comprises: (a) means defined in the upper end portion of the guide thimble to permit inward elastic collapse thereof to a compressed position upon application of forces directed radially inward toward the axis of the upper end portion and outward elastic return thereof to an expanded position upon removal of the radially inward directed forces; (b) upper means formed in the upper end portion of the guide thimble so as to provide the upper end portion at the location of the upper means with a diametric size greater than that of the adapter plate passageway when the guide thimble upper end portion is at its expanded position and a diametric size less than that of the adapter plate passageway when the upper end portion is collapsed to its compressed position upon application of the radially inward directed forces during insertion and withdrawal of the upper end portion into and from the adapter plate passageway; and (c) lower means formed in the upper end portion of the guide thimble so as to provide the upper end portion at the location of the lower means with a diametric size greater than that of the adapter plate passageway when the guide thimble upper end portion is at either one of its expanded and collapsed positions. The upper means is axially displaced from the lower means through a distance approximately equal to that between the top and bottom surfaces of the adapter plate such that after insertion of the upper end portion of the guide thimble through the adapter plate passageway the adapter plate is placed in a captured position between the upper and lower means. Also, the double lock joint structure includes a locking tube insertable into and removable from the upper end portion of the guide thimble between a locking position which maintains the upper end portion in the expanded position and the adapter plate in the captured position between the upper and lower means and an unlocking position which permits the upper end portion to inwardly collapse to the compressed position upon insertion and removal of the adapter plate onto and from the upper end portion.

More particularly, the means defined in the upper end portion of the guide thimble to permit inward elastic collapse thereof to the compressed position is at least one axially extending slot formed in the upper end portion. Further, the upper and lower means each takes the form of bulges, preferably circumferentially, formed in the upper end portion of the guide thimble.

Additionally, the locking tube includes upper and lower axially, and preferably circumferentially, displaced protuberances adapted to mate with the upper and lower annular bulges of the guide thimble upper end portion when the locking tube is inserted at its locking position therein and unmate from the upper and lower bulges when the locking tube is removed from the guide thimble upper end portion. Also, the locking tube includes a top annular flange located above the upper protuberance for facilitating insertion and removal of the tube into and from the guide thimble upper end portion.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
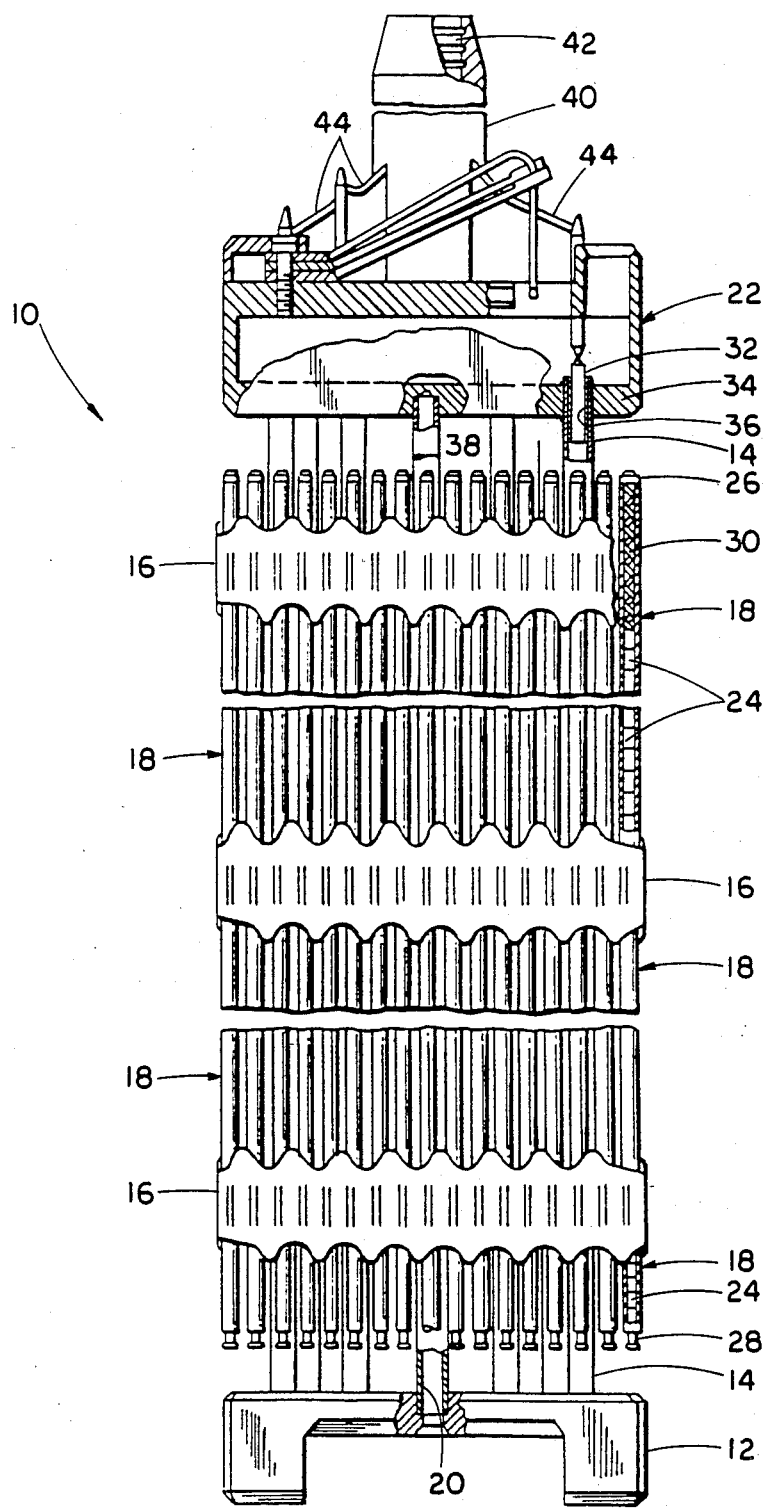
FIG. 1 is a side elevational view, with parts partially sectioned and broken away for purposes of clarity, of a reconstitutable fuel assembly employing the improved features of the present invention.
Figure 2:
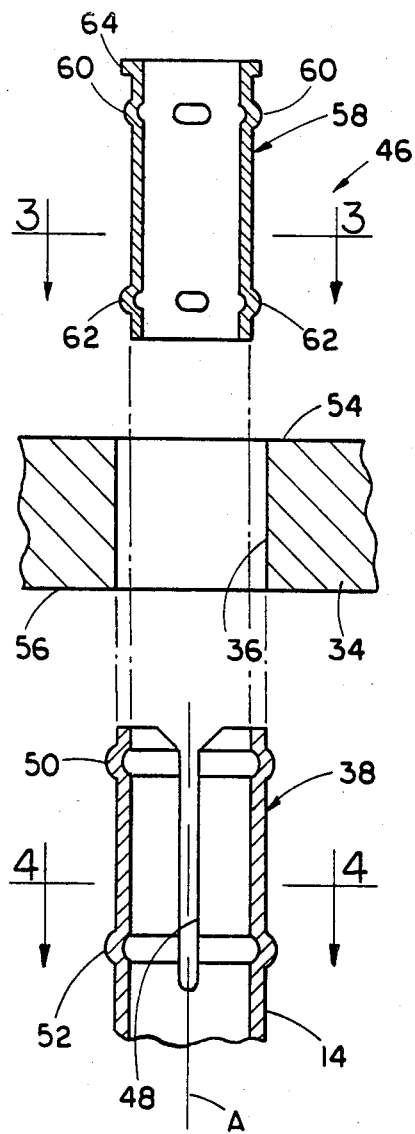
FIG. 2 is a sectioned, exploded view of the components of the double lock structure associated with the top nozzle and guide thimbles of the reconstitutable fuel assembly and including the improved features of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a reconstitutable nuclear fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14, in a manner fully described below, to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. The top nozzle 22 has a lower adapter plate 34 with a plurality of passageways 36 (only one being shown) formed through the adapter plate. The guide thimbles 14 which receive the control rods 32 have their uppermost end portions 38 coaxially positioned within the adapter plate passageway 36. Specifically, operatively associated with the top nozzle 22 is a rod cluster control mechinism 40 havng an internally threaded cylindrical member 42 with a plurality of radially extending flukes or arms 44. Each arm 44 is interconnected to one or more control rods 32 such that the control mechanism 40 is operable to move the control rods 32 vertically in the guide thimbles 14 to thereby control the fission process in the fuel assembly 10, all in a well-known manner.

Double Lock Joint Structure for Releasably Attaching Top Nozzle to Guide Thimbles Referring now to FIGS. 2 through 5, there is seen the improved features of the present invention for releasably connecting the lower adapter plate 34 of the top nozzle 22 to the upper end portions 38 of the guide thimbles 14 for facilitating access to the fuel rods 18 of the fuel assembly 10. The improved features of the present invention comprise components of a double lock joint structure, generally designated 46.

As depicted in FIGS. 2 through 5, the double lock joint structure 46 includes axially extending slots 48, being four in number in the illustrated embodiment, defined in each guide thimble upper end portion 38 which permit inward elastic collapse thereof to a compressed position upon application of sufficient forces directed radially inward toward a central axis A of the upper end portion 38. The upper end portion 38 elastically returns outward to an expanded position upon removal of the radially inward directed forces thereto. These forces are imposed on the upper end portion 38 of each guide thimble 14 whenever the adapter plate 34 is applied to it.

Figure 5:
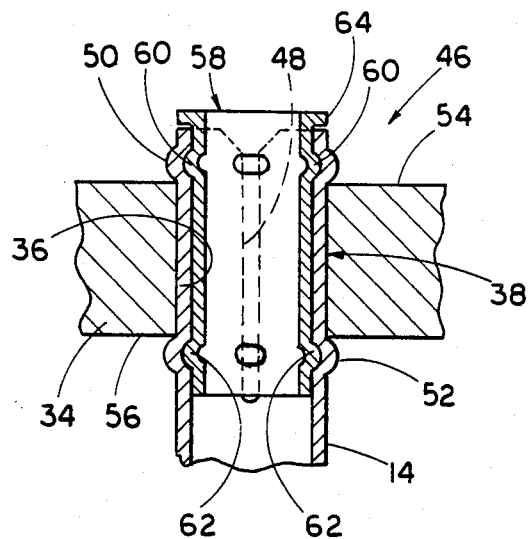
FIG. 5 is a sectional view showing all of the components of the double lock joint structure of FIG. 2 assembled together.
Figure 3:
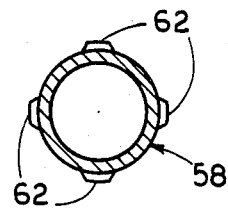
FIG. 3 is an enlarged sectional view, as taken along line 3—3 of FIG. 2, of the locking tube which includes some of the improved features of the present invention.
Figure 4:
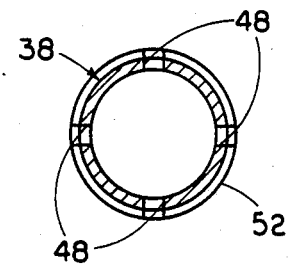
FIG. 4 is an enlarged sectional view, as taken along line 4—4 of FIG. 2, of the upper end portion of the guide thimble which incorporates other improved features of the present invention.

The joint structure 46 also includes means preferably taking the shape of axially spaced upper and lower annular bulges 50,52 formed circumferentially in the upper end portion 38. The upper annular bulge 50 has an outside diametric size greater than the inside diametric size of a given adapter plate passageway 36 when the guide thimble upper end portion 38 is at its expanded position. On the other hand, the outside diametric size of the upper bulge 50 reduces to less than the inside diametric size of the adapter plate passageway 36 when the upper end portion 38 is collapsed to its compressed position due to application of the radially inward directed forces thereto during insertion and withdrawal into and from the adapter plate passageway 36. However, in the case of the annular bulge 52, it has an outside diametric size which is greater than the inside diametric size of the one adapter plate passageway 36 when the guide thimble upper end portion 38 is at either one of its expanded and collapsed positions. For locking the guide thimble upper end portion 38 to the adapter plate 34, the upper annular bulge 50 is axially displaced from the lower annular bulge 52 through a distance approximately equal to that between top and bottom surfaces 54,56 of the adapter plate 34. Therefore, after insertion of the upper end portion 38 of the guide thimble 14 through the adapter plate passageway 36, as shown in FIG. 5, the upper annular bulge 50 is located above the adapter plate 34 adjacent to and in contact with the top surface 54 thereof, the lower annular bulge 52 is located below the adapter plate 34 adjacent to and in contact with the bottom surface 56 thereof and the adapter plate 34 is placed in a captured position between the upper and lower annular bulges 50,52.

Further, the joint structure 46 includes a locking tube 58 removably inserted into each guide thimble upper end portion 38 to a locking position therein which maintains the upper end portion in its expanded position and the adapter plate 34 in the captured position between the upper and lower annular bulges 50,52. Removal of the locking tube 58 withdraws it to an unlocking position which permits the upper end portion 38 to inwardly collapse to its compressed position upon removal of the adapter plate 34 from the upper end portion. The upper end portion 38 can also be collapsed to its compressed position upon insertion of the adapter plate 34 back on the guide thimble 14.

For securing the locking tube 58 at its locking position in the upper end portion 38 of the guide thimble 14, the tube includes upper and lower axially, and circumferentially, displaced protuberances 60,62 in the form of short segments adapted to mate with the upper and lower annular bulges 50,52 of the guide thimble upper end portion 38. Also, a top annular flange 64 on the tube 58 is located above the upper protuberance 60 for facilitating gripping of the tube for insertion and removal of the tube into and from the guide thimble upper end portion 38.

While the upper and lower bulges 50,52 are illustrated as each extending circumferentially about the upper end portion 38, it should be understood that each bulge need not be continuous about the upper end portion, but can be in the form of a series of short segments similar to the protuberances 60,62 of the locking tube 58. Likewise, it should be understood that when the upper and lower bulges 50,52 are continuous as is illustrated, the upper and lower protuberances 60,62 of the locking tube 58 can extend continuously about the tube similar to the upper and lower bulges, instead of being short segments.

It is thought that the present invention and many of its attendant advantages will be understood from the foregoing description and it will be apparent that various changes may be made in the form, construction and arrangement thereof without departing from the spirit and scope of the invention or sacrificing all of its material adavantages, the form hereinbefore described being merely a preferred or exemplary embodiment thereof.

I claim:

1. In a reconstitutable fuel assembly including at least one guide thimble with an upper end portion having a central axis and a top nozzle with an adapter plate having top and bottom spaced apart surfaces and at least one passageway extending between said surfaces, a double lock joint structure for attaching said top nozzle adapter plate in releasable locking engagement upon said guide thimble upper end portion, comprising:
   (a) means defined in said upper end portion of said guide thimble to permit inward elastic collapse thereof to a compressed position upon application of forces directed radially inward toward the axis of said upper end portion and outward elastic return thereof to an expanded position upon removal of said radially inward directed forces;
   (b) upper means formed in said upper end portion of said guide thimble so as to provide said upper end portion at the location of said upper means with a diametric size greater than that of said adapter plate passageway when said guide thimble upper end portion is at its expanded position and a diametric size less than that of said adapter plate passageway when said upper end portion is collapsed to its compressed position upon application of said radially inward directed forces during insertion and withdrawal of said upper end portion into and from said adapter plate passageway; and
   (c) lower means formed in said upper end portion of said guide thimble so as to provide said upper end portion at the location of said lower means with a diametric size greater than that of said adapter plate passageway when said guide timble upper end portion is at either one of its expanded and collapsed positions;
   (d) said upper means being axially displaced from said lower means through a distance approximately equal to that between said top and bottom surfaces of said adapter plate such that with said upper end portion of said guide thimble inserted through said adapter plate passageway, said upper means is located above said adapter plate adjacent to said top surface thereof, said lower means is located below said adapter plate adjacent to said bottom surface thereof and said adapter plate is placed in a captured position between said upper and lower means of said guide thimble upper end portion.

2. The double lock joint structure as recited in claim 1, further comprising:
   (e) a locking tube insertable into and removable from said upper end portion of said guide thimble between a locking position which maintains said upper end portion in said expanded position and said adapter plate in said captured position between said upper and lower means and an unlocking position which permits said upper end portion to inwardly collapse to said compressed position upon insertion and removal of said adapter plate onto and from said upper end portion.

3. The double lock joint structure as recited in claim 2, wherein said locking tube includes upper and lower axially displaced means adapted to mate with said upper and lower means of said guide thimble upper end portion when said locking tube is inserted at its locking position therein and unmate from said upper and lower means when said locking tube is removed from said guide thimble upper end portion.

4. The double lock joint structure as recited in claim 3, wherein said upper and lower axially displaced means are circumferentially displaced protuberances formed in said locking tube.

5. The double lock joint structure as recited in claim 4, wherein said locking tube includes a top annular flange located above said upper protuberance for facilitating insertion and removal of said tube into and from said guide thimble upper end portion.

6. The double lock joint structure as recited in claim 1, wherein said means defined in said upper end portion of said guide thimble to permit inward collapse thereof to said compressed position is at least one axially extending slot formed in said upper end portion.

7. The double lock joint structure as recited in claim 1, wherein said upper means is an annular bulge formed in said upper end portion of said guide thimble.

8. The double lock joint structure as recited in claim 1, wherein said lower means is an annular bulge formed in said upper end portion of said guide thimble.

9. In a reconstitutable fuel assembly including at least one guide thimble with an upper end portion having a central axis and a top nozzle with an adapter plate having top and bottom spaced apart surfaces and at least one passageway extending between said surfaces, a double lock joint structure for attaching said top nozzle adapter plate in releasable locking engagement upon said guide thimble upper end portion, comprising:
   (a) means in the form of at least one axially extending slot defined in said upper end portion of said guide thimble to permit inward elastic collapse thereof to a compressed position upon application of forces directed radially inward toward the axis of said upper end portion and outward elastic return thereof to an expanded position upon removal of said radially inward directed forces;
   (b) upper means in the form of a bulge formed in said upper end portion of said guide thimble so as to provide said upper end portion at the location of said upper bulge with an outside diametric size greater than the inside diametric size of said adapter plate passageway when said guide thimble upper end portion is at its expanded position and less than the inside diametric size of said adapter plate passageway when said upper end portion is collapsed to its compressed position upon application of said radially inward directed forces during insertion and withdrawal of said upper end portion into and from said adapter plate passageway; and (c) lower means in the form of a bulge formed in said upper end portion of said guide thimble so as to provide said upper end portion at the location of said lower bulge with an outside diametric size greater than the inside diametric size of said adapter plate passageway when said guide timble upper end portion is at either one of its expanded and collapsed positions;

(d) said upper bulge being axially displaced from said lower bulge through a distance approximately equal to that between said top and bottom surfaces of said adapter plate such that with said upper end portion of said guide timble inserted through said adapter plate passageway, said upper bulge is located above said adapter plate adjacent to said top surface thereof, said lower bulge is located below said adapter plate adjacent to said bottom surface thereof and said adapter plate is placed in a captured position between said upper and lower bulges of said guide thimble upper end portion.

10. The double lock joint structure as recited in claim 9, further comprising:

(e) a locking tube insertable into and removable from said upper end portion of said guide thimble between a locking position which maintains said upper end portion in said expanded position and said adapter plate in said captured position between said upper and lower bulges of said guide thimble upper end portion and an unlocking position which permits said upper end portion to inwardly collapse to said compressed position upon insertion and removal of said adapter plate onto and from said upper end portion.

11. In a reconstitutable fuel assembly including at least one guide thimble with an upper end portion having a central axis and a top nozzle with an adapter plate having top and bottom spaced apart surfaces and at least one passageway extending between said surfaces, a double lock joint structure for attaching said top nozzle adapter plate in releasable locking engagement upon said guide thimble upper end portion, comprising:

(a) means in the form of at least one axially extending slot defined in said upper end portion of said guide thimble to permit inward elastic collapse thereof to a compressed position upon application of forces directed radially inward toward the axis of said upper end portion and outward elastic return thereof to an expanded position upon removal of said radially inward directed forces;

(b) upper means in the form of an annular bulge formed in said upper end portion of said guide thimble and having an outside diametric size greater than the inside diametric size of said adapter plate passageway when said guide thimble upper end portion is at its expanded position and less than the inside diametric size of said adapter plate passageway when said upper end portion is collapsed to its compressed position upon application of said radially inward directed forces during insertion and withdrawal of said upper end portion into and from said adapter plate passageway;

(c) lower means in the form of an annular bulge formed in said upper end portion of said guide thimble and having an outside diametric size greater than the inside diametric size of said adapter plate passageway when said guide thimble upper end portion is at either one of its expanded and collapsed positions;

(d) said upper annular bulge being axially displaced from said lower annular bulge through a distance approximately equal to that between said top and bottom surfaces of said adapter plate such that with said upper end portion of said guide thimble inserted through said adapter plate passageway, said upper annular bulge is located above said adapter plate adjacent to and in contact with said top surface thereof, said lower annular bulge is located below said adapter plate adjacent to and in contact with said bottom surface thereof and said adapter plate is placed in a captured position between said upper and lower annular bulges of said guide thimble upper end portion; and (e) a locking tube insertable into and removable from said upper end portion of said guide thimble between a locking position which maintains said upper end portion in said expanded position and said adapter plate in said captured position between said upper and lower annular bulges of said guide thimble upper end portion and an unlocking position which permits said upper end portion to inwardly collapse to said compressed position upon insertion and removal of said adapter plate onto and from said upper end portion;

(f) said locking tube including upper and lower axially displaced protuberances adapted to mate with said upper and lower annular bulges of said guide thimble upper end portion when said locking tube is inserted at its locking position therein.

12. The double lock joint structure as recited in claim 11, wherein said locking tube includes a top annular flange located above said upper protuberance for facilitating insertion and removal of said tube into and from said guide thimble upper end portion.

* * * * *